Dec. 16, 1930. P. B. LIEBERMANN 1,785,032
JOURNAL BOX
Filed June 28, 1926

INVENTOR:
PAUL B. LIEBERMANN,
BY
HIS ATTORNEY.

Patented Dec. 16, 1930

1,785,032

UNITED STATES PATENT OFFICE

PAUL B. LIEBERMANN, OF SANTA BARBARA, CALIFORNIA, ASSIGNOR TO GENERAL MOTORS CORPORATION, OF DETROIT, MICHIGAN, A CORPORATION OF DELAWARE

JOURNAL BOX

Application filed June 28, 1926. Serial No. 118,964.

This invention relates to journal boxes and comprises all the features of novelty herein disclosed, by way of example, as embodied in a car axle box having provision for taking end thrust.

An object of the invention is to provide improved means for resisting the end thrust of a shaft in a journal box. Another object is to provide a simple and effective device of this character and one that is self-lubricating.

To these ends and also to improve generally upon devices of the character indicated the invention consists in the various matters hereinafter described and claimed.

In the drawings, Figure 1 is a central vertical section.

Figure 1:
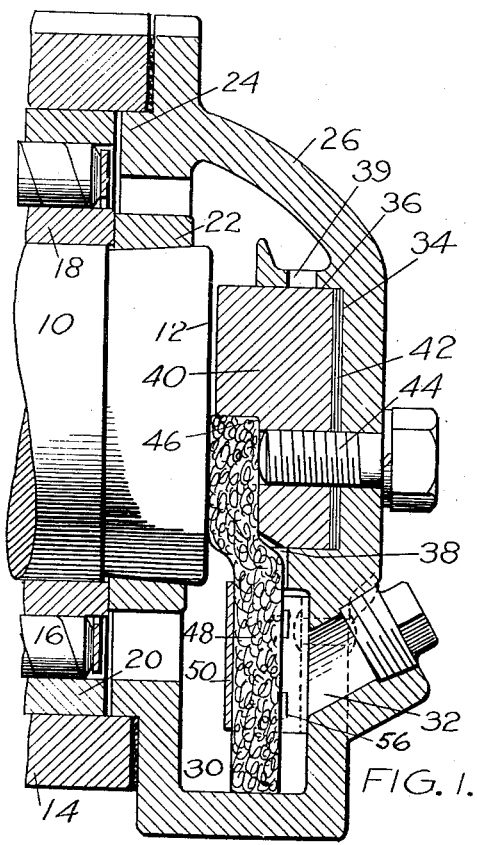
Figure 2:
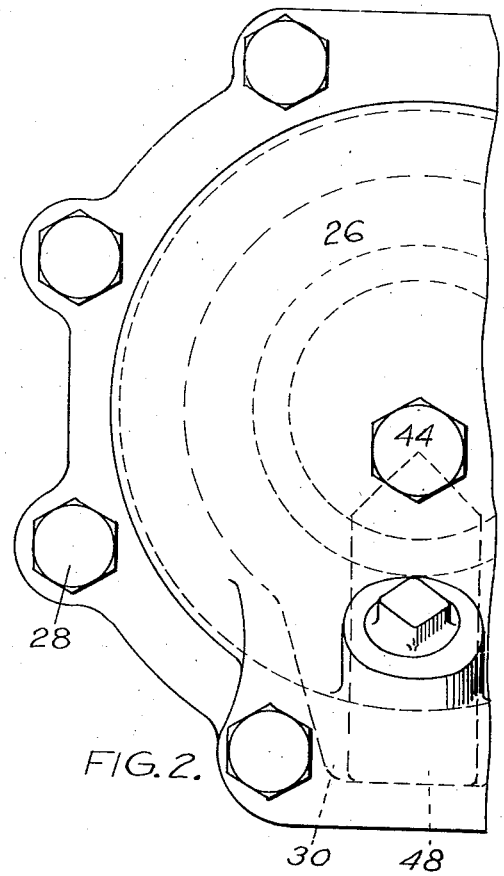
Figure 2 is a partial end view.
Figure 3:
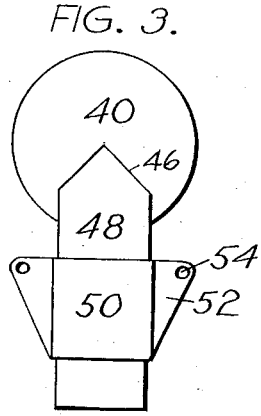
Figure 3 is an end view of certain parts inside the box.
Figure 4:
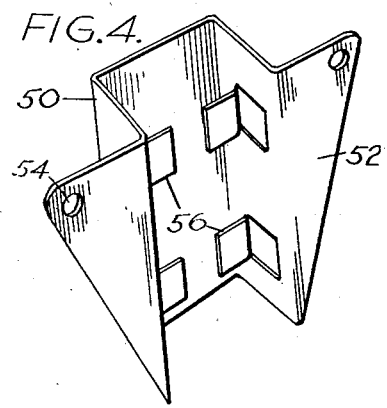
Figure 4 is a perspective view of a detail.

The numeral 10 designates a shaft or axle having its end faced off smooth to form a thrust face 12. The shaft is shown journalled in an axle box 14 carrying roller bearings 16, suitable bushings or liners 18 and 20 being interposed between the rollers and the shaft and the box. The inner liner 18 is held on the shaft by a shrink collar 22 and the outer liner 20 is held by an annular flange 24 on an end cap 26 which completes the box and is secured to the body of the box by bolts 28. The cap is enlarged at its lower portion to form a lubricant receptacle or reservoir 30 to which lubricant is supplied through an inlet passage 32 closed by a screw plug.

The cap has a circular recess 34 in line with the shaft, the recess having a substantially circular side wall or flange 36. The wall projects inwardly and has a slot 38 for a wick and an opening 39 for splashed lubricant thrown off from the shaft. A circular thrust plate or button 40 fits externally in the recess and projects beyond it in a position to engage and rub on the face 12 of the shaft. The amount of projection can be varied or adjusted for wear by interposing any suitable number of thin spacing plates 42 between the thrust plate and the bottom of its recess. The thrust plate is securely held against rotation by a screw 44 passing through the end cap and the spacers and arranged off center with respect to the thrust plate. The thrust plate 40 is backed up and exteriorly supported by the correspondingly shaped wall 36 and by the spacing plates and hence it is not peened out of shape by the heavy end thrust blows of the shaft.

The lower portion of the end face of the thrust plate is cut away as indicated at 46 to receive the correspondingly shaped upper end of an absorbent pad or wick 48 which extends down through the slot 38 into the lubricant reservoir. The wick normally projects a little beyond the thrust plate so that, whenever the shaft shifts endwise, it will rub against and squeeze the wick to obtain a supply of lubricant for the engaging thrust faces. The wick is held by a U-shaped clip 50 which embraces the offset lower portion of the wick, the ends 52 of the clip being bent outwardly and secured, as by rivets at 54, to the inner wall of the end cap. The wick holding means is spaced from the thrust plate so that either the wick or the thrust plate can be individually removed from the end cap. The clip also has holding fins 56 at the outer side of the wick and accessible through the filling opening. A portion of the wick is parallel to the thrust face 12 for contact only with the central area thereof and another portion is offset towards the thrust plate and is spaced from the path of the outer area of the thrust face 12. The annular area of the thrust face outside the wick engaging area accumulates lubricant from the wick by gravity and by centrifugal action and distributes some of it to the shaft bearings.

I claim:

1. In a device of the character described, a journal box, a shaft journalled therein and having a smooth end face, a cap closing the end of the box and having its lower portion enlarged to form a lubricant reservoir, said cap also having a circular recess in line with the end of the shaft, a circular plate fitting in said recess and projecting therefrom to engage the end face of the shaft, said plate having a portion of its projecting face cut away, a wick set in said cut away portion and extending into the lubricant reservoir, and means for holding said circular plate from rotation; substantially as described.

2. In a device of the character described, a journal box, a shaft journalled therein and having a smooth end face, a cap closing the end of the box and having its lower portion enlarged to form a lubricant reservoir, said cap also having a circular recess in line with the end of the shaft, a circular plate fitting in said recess and projecting therefrom to engage the end face of the shaft, said plate having a portion of its projecting face cut away, a wick set in said cut away portion and extending into the lubricant reservoir, and a U-shaped clip embracing the wick and having its ends secured to the end cap; substantially as described.

3. In a device of the character described, an axle box having a lubricant receptacle, an axle journalled in the axle box and having a thrust face, a thrust plate secured to the end of the box and spaced from the thrust face, and a wick extending from the lubricant receptacle to the thrust plate, a portion of the wick being positioned for contact with the central area of the thrust face of the axle and another portion being bent to space it away from the outer area of the thrust face; substantially as described.

4. In a device of the character described, a housing having a lubricant receptacle, a shaft journalled in the housing and having a thrust face, a thrust plate, a wick extending from the lubricant receptacle to the thrust plate, a portion of the wick being positioned in a slot of the thrust plate for contact with the thrust face of the shaft and another portion being bent to offset it from the thrust face, and means for holding the offset portion of the wick to a part of the housing below the thrust plate; substantially as described.

5. In a device of the character described, a housing having a lubricant receptacle, a shaft journalled in the housing and having a thrust face, a thrust plate, a wick extending from the lubricant receptacle to the thrust plate, a portion of the wick being positioned in a slot of the thrust plate for contact with the thrust face of the shaft and another portion being offset from the thrust face, the housing having a filling opening placed opposite the offset portion of the wick; substantially as described.

6. In a device of the character described, a housing having a lubricant receptacle, a shaft journalled in the housing and having a thrust face, a thrust plate, a wick extending from the lubricant receptacle to the thrust plate, a portion of the wick being positioned in a slot of the thrust plate for contact with the thrust face of the shaft and another portion being offset, and means for holding the offset portion of the wick to a part of the housing below the thrust plate, the end of the housing having an opening adjacent to the holding means; substantially as described.

7. In a device of the character described, a journal box, a shaft journalled in the box and having a smooth end face, a cap closing the end of the box and having a recess in line with the end of the shaft, a thrust plate externally fitting the sides of the recess and confined thereby against change in shape due to the peening action of the shaft, spacing plates in the recess for rigidly backing up the thrust plate, a wick extending from the lower part of the box to the thrust plate and contacting with the end face of the shaft, and means for holding the thrust plate against the spacing plates; substantially as described.

8. In a device of the character described, a journal box, a shaft journalled in the box and having a smooth end face, a cap closing the end of the box and having its lower portion enlarged to form a lubricant reservoir, said cap having a recess in line with the end of the shaft, a thrust plate fitting in the recess and projecting therefrom to engage the end face of the shaft, means for securing the thrust plate in the recess, and a wick extending from the thrust plate to the reservoir in the end cap; substantially as described.

9. In a device of the character described, a journal box, a shaft journalled in the box and having an end thrust face, a cap closing the end of the box and having its lower portion enlarged to form a lubricant reservoir, a thrust plate fixed to said end cap for engaging the end thrust face of the shaft, a wick positioned in a slot of the thrust plate and extending to the reservior in the end cap, and means for holding the wick to the end cap, said holding means being spaced from the thrust plate to allow the removal of the thrust plate from the end cap while the wick remains in the reservoir; substantially as described.

In testimony where 1 hereunto affix my signature.

PAUL B. LIEBERMANN.